(12) United States Patent
Pappas et al.

(10) Patent No.: US 11,484,394 B2
(45) Date of Patent: Nov. 1, 2022

(54) TWO-PART MODELLING AID

(71) Applicant: STRAUMANN HOLDING AG, Basel (CH)

(72) Inventors: Christos Pappas, Basel (CH); Philippe Kern, Basel (CH); Isabell Wiestler, Basel (CH); Boris Martin, Basel (CH)

(73) Assignee: STRAUMANN HOLDING AG, Basel (CH)

( * ) Notice: Subject to any disclaimer, the term of this patent is extended or adjusted under 35 U.S.C. 154(b) by 370 days.

(21) Appl. No.: 16/496,293

(22) PCT Filed: Mar. 19, 2018

(86) PCT No.: PCT/EP2018/056846
§ 371 (c)(1),
(2) Date: Sep. 20, 2019

(87) PCT Pub. No.: WO2018/172261
PCT Pub. Date: Sep. 27, 2018

(65) Prior Publication Data
US 2020/0046468 A1    Feb. 13, 2020

(30) Foreign Application Priority Data

Mar. 20, 2017    (EP) ..................................... 17161892

(51) Int. Cl.
*A61C 8/00*        (2006.01)
(52) U.S. Cl.
CPC ............ *A61C 8/009* (2013.01); *A61C 8/0059* (2013.01); *A61C 8/0068* (2013.01); *A61C 2008/0084* (2013.01)
(58) Field of Classification Search
CPC ..... A61C 8/009; A61C 8/0059; A61C 8/0068; A61C 8/0089; A61C 8/005; A61C 8/0048; A61C 2008/0084
(Continued)

(56) References Cited

U.S. PATENT DOCUMENTS

| 5,527,182 A | 6/1996 | Willoughby |
| 8,845,327 B2 | 9/2014 | Schlussel et al. |
| 2014/0065574 A1 | 3/2014 | Benzon |

FOREIGN PATENT DOCUMENTS

| EP | 1 920 729 B1 | 12/2009 |
| EP | 2 127 612 A1 | 12/2009 |

(Continued)

OTHER PUBLICATIONS

Sep. 24, 2019 International Preliminary Report on Patentability issued in International Patent Application No. PCT/EP2018/056846.

(Continued)

*Primary Examiner* — Ralph A Lewis
*Assistant Examiner* — Mirayda A Aponte
(74) *Attorney, Agent, or Firm* — Oliff PLC

(57) ABSTRACT

A two part modelling aid for connection to a dental implant component including a hollow base part and a hollow angled part, each including a tubular side wall extending between apical and coronal ends. The base part side wall includes an anti-rotation section including a non-circular symmetric cross-section in a plane perpendicular to a longitudinal axis of the base part. The angled part side wall forms an apical portion that extends along a first axis and is sized and shaped to form a friction fit with the base part, and a coronal portion extending along a second axis non-coaxial to the first axis. When connected, a closed channel is formed extending from the base part to the angled part, and the first axis of the apical portion is coaxial to the longitudinal axis of the base part and the anti-rotation section is exposed on a base part surface.

21 Claims, 10 Drawing Sheets

(58) Field of Classification Search
USPC .................................... 433/172–173, 201.1
See application file for complete search history.

(56) References Cited

FOREIGN PATENT DOCUMENTS

| | | | | |
|---|---|---|---|---|
| EP | 2127612 A1 * | 12/2009 | ............. | A61C 8/005 |
| EP | 2 486 889 A1 | 8/2012 | | |
| EP | 2486889 A1 * | 8/2012 | ........... | A61C 8/0068 |
| JP | 11-47158 A | 2/1999 | | |
| WO | 2008/051163 A1 | 5/2008 | | |
| WO | 2014/200404 A1 | 12/2014 | | |

OTHER PUBLICATIONS

May 17, 2018 Search Report issued in International Patent Application No. PCT/EP2018/056846.

* cited by examiner

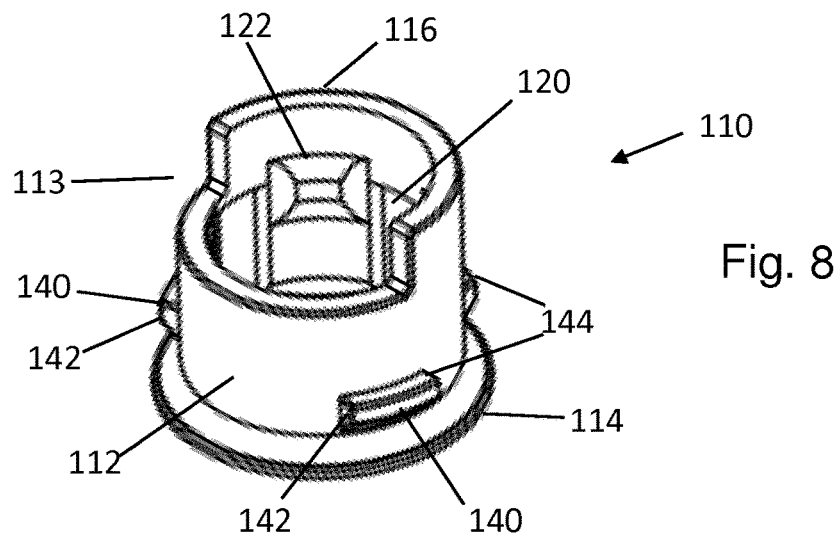
Fig. 8
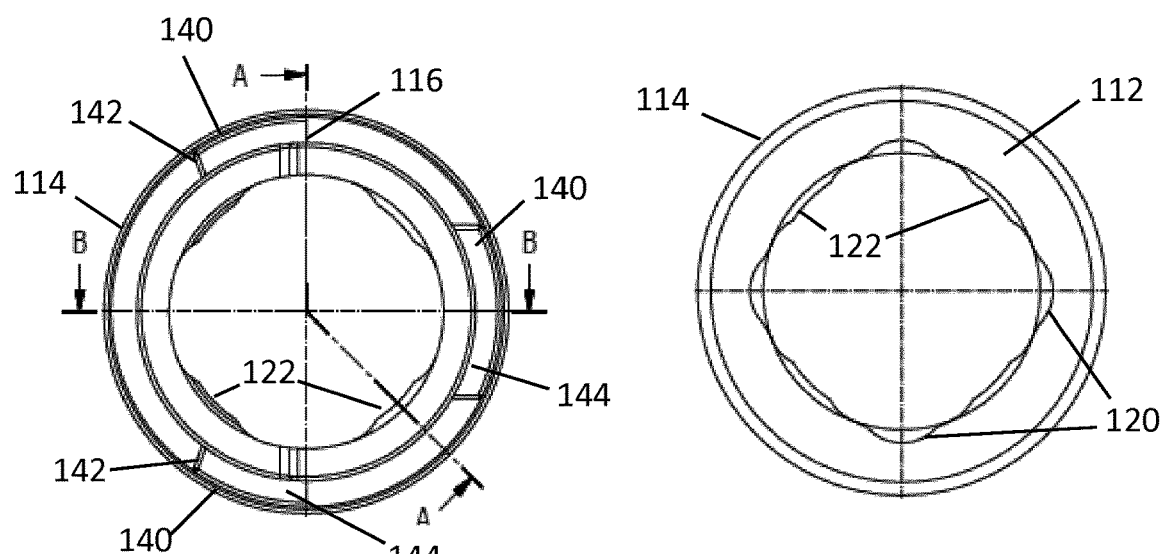
Fig. 9A
Fig. 9B
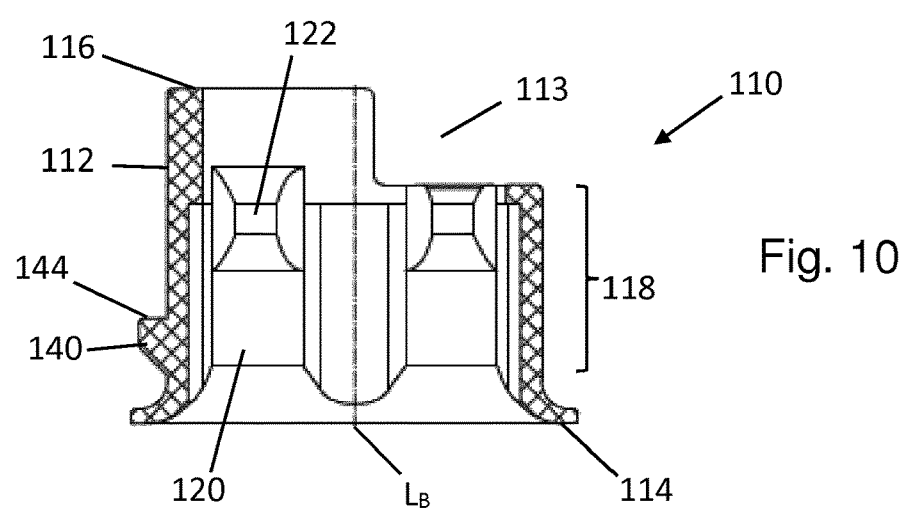
Fig. 10

TWO-PART MODELLING AID

This invention relates to a two part modelling aid which can be used to create a prosthetic component, for use with a dental implant, having a curved or angled screw channel.

Dental implants are used to replace one or more teeth in a patient's mouth. Implants have two essential parts: an anchoring part and an abutment part. The anchoring part is embedded in the bone, where it osseointegrates with the bone tissue to provide a firm anchor for the prosthesis. The abutment extends into the oral cavity and provides a core support for the prosthesis (e.g. bridge or crown), which is fixed over the abutment.

The implant can be constructed in one part, such that the anchoring part and the abutment part are produced in one monolithic piece. However, implants are more commonly constructed in two or more parts, in which case they consist of at least an anchoring component, often referred to in isolation as the implant, and a separate abutment, sometimes referred to as a spacer. The anchoring component is usually either embedded completely in the bone, that is to say to the height of the alveolar crest, or protrudes by a few millimetres from the alveolar crest into the soft tissue. The abutment is mounted either directly or indirectly to the anchoring component.

Often the prosthesis is also formed of multiple parts, most usually a coping, which provides the rough shape of the tooth, and a veneer, which forms the final shape of the prosthesis and provides a colour and opacity very similar to natural dentition. The coping can either be a stock shape or individually formed. Often the coping itself can be multi-part, with a stock base component designed to precisely fit to the underlying implant component (e.g. abutment) and an individualized component which is bonded or integrally formed on the base component. Such multi-part prostheses are used as the materials most commonly used for veneering do not have sufficient strength to form the complete prosthesis and hence the internal volume of the prosthetic component is provided by the stronger coping material.

One well known method of creating an individualized coping is via the "lost wax method". In this method, the shape of the coping is built up on an abutment or base coping using wax. The wax model, together with the component on which it has been built, is then encased in plaster and heated, such that the wax melts and leaves behind a cavity having the same shape as the wax model. This cavity then acts as a mould for casting the individualized coping using, e.g. gold, cobalt chrome or polymer (e.g. PMMA). Alternatively the created mould can be used for pressing a ceramic coping. The lost wax method is described, for example, in U.S. Pat. No. 3,322,187. In such methods, after casting, the individualized part of the coping forms an integral piece with the underlying component.

The various components of an implant system, e.g. implant, abutment, prosthesis etc, can be connected together by a number of different means, including bonding (cementing) and screwing. Screwed retention between components is particularly preferred as it provides a firm yet reversible connection, which allows for the replacement of system components that become damaged over time. While components can be directly screwed together, i.e. one component comprises a threaded shaft for fastening to a threaded bore of the other component, often a separate fastening screw is used. This enables the components of the system to be fastened together by a screw connection whilst also being placed in non-rotational engagement with each other, thus providing an exact pre-determined angular position relative to one another. This is helpful both in terms of preventing loosening over time as well as ensuring that the prosthesis is correctly aligned with existing dentition. A non-rotational engagement is achieved by providing anti-rotation means on the cooperating components. The anti-rotation means take the form of complementary portions on each component which have a non-circular-symmetric cross-section, e.g. oval, polygonal, protrusions etc. When the anti-rotation means are placed in contact with one another it is therefore not possible to rotate either component relative to the other. The rotational symmetry of the anti-rotation means determines the number of angular orientations possible between the components.

When a separate fastening screw is used to connect dental implant together it is of course necessary for a screw channel to be present.

In order to assist in the creation of an individualised coping having a screw channel via the lost wax method, components known as modelling aids, or burn out copings, are used. These are, in essence, plastic tubes that attach to the underlying component, e.g. abutment or base coping, such that the tube forms a continuation of the screw channel formed in this component. The wax can be built up around the tube, which then defines the screw channel through the resulting coping. The modelling aid is made from a combustible material such that this is removed together with the wax during heating of the cast. One such modelling aid is known from EP1920729.

When a screw-retained prosthesis is located in the anterior region of the mouth, for aesthetic reasons the screw channel opening must be positioned on the lingual (non visible) side of the prosthesis. In order to facilitate this, there has been a move within the dental field to provide curved, or angled, screw channels. Such non-linear screw channels are also beneficial when a single prosthesis is being used to replace several teeth or even the whole dentition of a patient's upper or lower jaw. In such cases the prosthetic restoration must be connected to multiple implants, and the use of non-linear screw channels can greatly assist in correctly aligning the restoration with all implants.

One way of creating such a non-linear screw channel within a dental prosthesis is the use of a curved modelling aid, such as the type disclosed in WO2014/200404.

As mentioned above, in order to prevent loosening of the prosthesis, and to assist in correctly orientating this within the mouth, non-rotational engagement between dental implant components is often desired, especially on single tooth prostheses. When such anti-rotation means are present between a non-linear modelling aid and the underlying component, the angular orientation of the screw channel formed by the modelling aid, relative to the underlying component, is restricted. For example, when only one angular orientation is possible between the underlying component and modelling aid, the screw channel formed by the modelling aid can only be positioned in a single orientation. When the anti-rotation means has a four-fold symmetry, the angular orientation of the screw channel formed by the modelling aid is limited to four discrete possibilities, each at 90° to each other. This can prevent optimal placement of a non-linear screw channel, such that this is either partly visible and/or access to the channel is impeded by surrounding dentition. By "angular orientation" it is meant the position of a component relative to a second component with reference to a common axis of rotation between the components. Thus, the angular orientation of a component is altered by rotating it about the common axis. For this reason angular orientation can also be viewed as the rotational orientation of the component. Both terms are therefore used interchangeably herein.

One way of overcoming this problem is to provide a large range of modelling aids in which the non-linear channel is provided at different angular orientations with respect to the anti-rotation means. However, this results in the need to manufacture a large number of components. In addition, the dental technician may not know precisely which modelling aid will best suit a particular prosthesis, leading to the need to order redundant components.

Alternatively, "ball and socket" type modelling aids are known which allow the screw channel orientation to be adjusted, e.g. US2014/0065574 and WO2008/051163. However, such systems are complex to produce and use. Further, no control is provided over the inclination of the channel, i.e. the angle of the channel from the vertical axis in a plane containing the axis, such that the incline of the final screw channel may be too great for the passage of the screw and/or use of the screwdriver. In addition, both of these systems require that the coping is cast directly onto the abutment. This requires that the abutment is made of a castable material, such as gold, and therefore limits the choice of abutment material.

There therefore exists the need for a simple, adaptable modelling aid for creating a non-linear screw channel.

According to one aspect, the present invention provides a two part modelling aid for connection to a dental implant component, the modelling aid comprising a hollow base part comprising an open apical end, an open coronal end and a tubular side wall extending from the apical to coronal end along a linear longitudinal axis, the side wall having an interior and an exterior surface, one of said surfaces comprising an anti-rotation section having a non-circular symmetric cross-section in a plane perpendicular to the longitudinal axis, and a hollow angled part comprising an open apical end, an open coronal end and a tubular side wall extending between the apical end and coronal end and having an interior and exterior surface, the tubular side wall forming an apical portion of the angled part extending along a first linear axis, and a coronal portion of the angled part extending along a second axis, the second axis being non-coaxial to the first axis such that the tubular sidewall creates a non-linear channel, the apical portion being sized and shaped to form a friction fit with the base part, wherein, when the base part is connected to the angled part, a closed channel is formed extending from the apical end of the base part to the coronal end of the angled part, the first axis of the apical portion of the angled part being coaxial to the longitudinal axis of the base part and the anti-rotation section of the base part being exposed on a surface of the base part.

The present invention therefore provides a non-linear modelling aid which enables the angular orientation of the screw channel to be adjusted independently of the anti-rotation section. While the modelling aid as a whole has an anti-rotation section, in order to enable precise orientation of the modelling aid relative to an underlying component of the implant system, e.g. abutment, the rotational orientation of the screw channel can be selected independently of this. This gives the user a large degree of flexibility using only a single modelling aid, without needing to order multiple, redundant parts. Further, the adjustment mechanism is very simple compared to the ball and joint systems referred to above, which require two additional components, a screw and driver, in order to set the angular orientation and incline of the screw channel.

In accordance with conventional dental terminology, "apical" refers to the direction towards the bone and "coronal" to the direction towards the teeth. Therefore the apical end of a component is the end which, in use, is directed towards the jaw bone and the coronal end is that which, in use, is directed towards the oral cavity. In the case of a modelling aid, which is usually used in a model of the mouth, these terms refer to the directions towards the model jawbone and teeth (oral cavity) respectively. As the modelling aid is intended for connection to an underlying dental component, the term "apical" can also be viewed as the direction towards the dental component and the term "coronal" to the opposing direction, as in use the dental component will be located closer to the jaw bone (or model of the jaw bone) than the modelling aid.

According to the present invention, when the base and angled parts are connected together, the anti-rotation section of the base part remains exposed. By "exposed" it is meant that the anti-rotation section is not covered by the apical portion of the angled part, such that this section remains accessible for connection to a complementary anti-rotation section of a dental implant component. The anti-rotation section can be located on the interior or exterior surface of the base part, and therefore it is possible for the anti-rotation section to be exposed on the interior surface while the exterior of the base part is covered by the angled part, or vice versa. In other words, when connected to the base part, the angled part may overlap the anti-rotation section as long as the angled part contacts the opposite surface of the base part to that on which the anti-rotation section is located. Alternatively, the angled part may form a friction fit with the surface of the base part on which the anti-rotation section is located, but at a position remote from the anti-rotation section.

According to the present invention, when the base and angled parts are connected together they form a closed channel. By "closed" is it meant that the side wall of the channel is continuous such that no gaps or openings are present. This ensures that a predefined screw channel is formed in the resulting coping. Although the side wall of the channel is continuous and closed, the channel is of course open at the apical and coronal ends, to allow a screw channel to be formed.

In some embodiments, the angled part of the modelling aid has complete rotational freedom relative to the base part, such that, while these parts are connected, the angled part can be rotated about the longitudinal axis of the base part into any desired angular orientation. In preferred embodiments however the degree of rotational freedom between the base and angled parts of the modelling aid is restricted. This can be beneficial as, when the anti-rotation section of the base part comprises multiple degrees of rotational symmetry, it will not be necessary to rotate the angled part completely around the longitudinal axis of the base part in order to obtain a full range of screw channel orientations.

For example, when the anti-rotation section of the base part comprises a cross-section having 6-fold rotational symmetry, e.g. a hexagon, the base part can be positioned in 6 discrete angular orientations with respect to the dental implant component to which it is connected, herein referred to as the underlying component, each at 60° intervals. This can be considered as the "macro placement" of the modelling aid. Changes in orientation greater than 60° can therefore be achieved through repositioning the base part of the modelling aid on the underlying component. For smaller angle changes however, the angled part must be rotated relative to the base part. This can be considered as the "micro placement" of the modelling aid. Because it is only necessary to rotate the angled part relative to the base part within the angle range of the macro placement, rotational stops can be provided to limit the relative rotation between the base and angled parts. In this example therefore, the relative rotation could be limited to 60°.

According to a preferred embodiment therefore, the base part and apical portion of the angled part each comprise at least two circumferentially spaced rotational stops, each stop being formed by a radially and axially extending surface, the rotational stops being arranged such that, when the base part is connected to the angled part, relative rotation in either direction is limited by the abutment of a rotational stop of the base part against a rotational stop of the angled part.

The rotational stops must therefore be positioned such that, when the angled and base parts are connected together, the rotational stops of the base part are in alignment with the rotational stops of the angled part, such that the stop surfaces cannot be rotated past one another.

The rotational stops of the base part are formed by surfaces which extend in both the radial and axial direction of the component. Similarly, the rotational stops of the angled part are formed by surfaces which extend in both the radial and axial direction of the apical portion. The rotational stops of both components can be created either by one or more protrusion extending radially from the sidewall of the part, or by one or more protrusion extending axially from the proximal end of the part. By "proximal end" it is meant the end of the part which, in use, is in closest proximity to the other part of the modelling aid; namely the coronal end of the base part and the apical end of the angled part.

Two rotational stops can be formed as opposing sides of a single protrusion, or as the mutually facing sides of two circumferentially spaced protrusions.

In one preferred embodiment, the base part and the apical portion of the angled part each comprise a single protrusion, wherein the opposing sides of the protrusion form the rotational stops of each part. In use the protrusion with the lesser circumferential extent is positioned between the opposing faces of the other protrusion.

In another, alternative, preferred embodiment one of the base part and the apical portion of the angled part comprises a single protrusion, wherein the opposing sides of the protrusion form the rotational stops of the part and the other of the base part and the apical portion of the angled part comprises at least two protrusions, wherein mutually facing sides of the protrusions form the rotational stops of the part. In use the single protrusion of either the base or angled part is positioned between the mutually facing sides of two protrusions on the other part.

Forming the rotational stops of both the base and angled parts from protrusions extending axially from the proximal end of the parts is not possible without creating gaps in the channel formed by the modelling aid, which would prevent the modelling aid from performing its primary function of defining a screw channel. It is however possible to create the rotational stops of both the base and angled parts from radially extending protrusions. For example, the apical portion of the angled part may comprise one or more inwardly extending protrusion on its interior surface while the base part comprises one or more outwardly extending protrusion on its exterior surface. Forming both sets of rotational stops from radially extending protrusions however reduces the amount of surface contact between the base and angled parts, and can result in gaps, which in turn can cause errors in the final cast product.

Therefore, preferably, the at least two rotational stops of one of the base part and the apical portion of the angled part are formed by one or more protrusion extending radially from the tubular side wall of the part and the at least two rotational stops of the other of the base part and apical portion of the angled part are formed by one or more protrusion extending axially from the proximal end of the part. In this way, the whole of the overlapping areas of the apical portion of the angled part and base part can lie in flush contact with one another.

In such embodiments it can be preferable that the one or more radially extending protrusion is located either in the apical most half of the base part or coronal most half of the apical portion of the angled part. This enables the base and angled parts to have a greater area of contact with each other, thus increasing the security of the connection between them.

Additionally or alternatively, in such embodiments, it is preferred that the one or more radially extending protrusion further comprises a planar proximally facing abutment surface, arranged such that, when the base part is connected to the angled part, the proximal end of the other part rests upon this. In this way, the correct relative axial locations of the base and angled parts can be clearly defined.

It is possible for one or both of the base and angled parts to be provided with more than two rotational stops. This enables the parts to be connected together in different rotational orientations while still restricting the rotational freedom between the parts. For example, one part may comprise a plurality of circumferentially spaced, radially extending protrusions on its exterior or interior surface, wherein the opposing sides of each protrusion form rotational stops. The cooperating part can comprise a single axially or radially extending protrusion which can be positioned in use between any of the plurality of radial protrusions. The circumferential extent between the plurality of radially extending protrusions can be equal or may vary in order to provide differing degrees of rotational freedom. Alternatively, one part can be provided with a plurality of axially extending protrusions, any two of which can be used in conjunction with a single radial protrusion on the interior or exterior surface of the other part in order to limit rotation. Most usually, when one of the base part and apical portion of the angled part comprises more than two rotational stops, the other part will comprise exactly two rotational stops, as providing both parts with more than two rotational stops introduces redundancies and unnecessary complexity into the system.

According to the present invention the apical portion of the angled part is sized and shaped to form a friction fit with the base part. In some embodiments, the apical portion can be sized and shaped to fit within the coronal end of the base part in order to create a friction fit with the interior surface of the base part. In such embodiments, when rotational stops are present, radially extending protrusions can be positioned on the interior surface of the base part and/or exterior surface of the apical portion of the angled part. However, as the modelling aid will ultimately be replaced in the casting process with metal or another material, such a configuration will reduce the width of the final screw channel. Therefore, preferably, the apical portion is sized and shaped to form a friction fit with the exterior surface of the base part. This enables the closed channel, and hence the resulting screw channel, to be kept as wide as possible.

In such embodiments, when rotational stops are present, the rotational stops of the apical portion of the angled part can be formed either by one or more protrusion extending radially inwards from the tubular side wall of the angled part or by one or more protrusion extending axially from the apical end of the angled part. In order to keep the wall of the final screw channel as smooth as possible, and thus prevent any narrowing of the channel and/or irregularities which may cause the screw or driver to catch within the screw channel, it is preferable in this embodiment that the at least two rotational stops of the apical portion of the angled part are formed by one or more protrusion extending axially from the apical end of the angled part and the at least two rotational stops of the base part are formed by one or more protrusion extending radially from the exterior surface of the sidewall of the base part. This ensures that the rotational stops of the base and angled parts are located on the exterior of the closed channel formed by the modelling aid.

In one such preferred embodiment, the base part comprises a single radially extending protrusion on its exterior surface and the apical portion of the angled part comprises a single protrusion extending axially from the apical end of the angled part, wherein, when the apical portion of the angled part is connected to the base part, the radial protrusion of the base part is positioned between the opposing faces of the axially extending protrusion. The degree of rotational freedom between the base and angled parts is determined by the relative circumferential extents of the protrusions. The greater the circumferential extent of the protrusions the lesser degree of rotational movement will be possible before a rotational stop of the base part comes into contact with a rotational stop of the angled part.

In a further, alternative preferred embodiment the base part comprises at least two radially extending protrusions on its exterior surface and the apical portion of the angled part comprises a single protrusion extending axially from the apical end of the angled part, wherein, when the apical portion of the angled part is connected to the base part, the axial protrusion of the angled part is positioned between the mutually facing ends of two radially extending protrusions of the base part. The degree of rotational freedom between the base and angled parts is determined by the circumferential extent of the axial protrusion and the distance between the radially extending protrusions. The greater the circumferential extent between the radially extending protrusions, and the lesser the circumferential extent of the axially extending protrusion, the greater degree of rotational movement will be possible before a rotational stop of the base part comes into contact with a rotational stop of the angled part.

As discussed above, it is preferred that the one or more radially extending protrusion comprises a planar proximally facing abutment surface. In the above embodiments therefore, in which the one or more radially extending protrusion is located on the base part and the apical portion of the angled part comprises one or more axially extending protrusion, it is preferable that each radially extending protrusion on the base part has a planar coronally facing abutment surface, which, in use, the apical end of the angled part abuts against.

In general it is preferred that the rotational stops of the base part and apical portion of the angled part are arranged such that the degree of relative rotational freedom between the base and angled parts is equal to the angle of rotational symmetry of the anti-rotation section. By "angle of rotational symmetry" it is meant the minimum number of degrees by which the anti-rotation section must be rotated in order to achieve symmetry. For example, an anti-rotation means having 2-fold symmetry must be rotated by 180° in order to look the same. Therefore, in this example, the preferred relative rotational freedom between the base and angled parts would be 180°. An anti-rotation section having a 6-fold symmetry must be rotated 60° in order to retain its original shape. Thus, in this example, the rotational stops would preferably give a rotational freedom of 60°. In a particularly preferred embodiment the anti-rotation means has 4-fold rotational symmetry. Hence, in such embodiments it can be preferred that the rotational stops are arranged to give a relative rotational freedom of 90°.

According to the present invention, the tubular sidewall of the angled part forms a non-linear channel between its apical and coronal ends. The apical portion of the angled part extends along a linear first axis, which in use is coaxial to the longitudinal axis of the base part and hence enables the apical portion of the angled part to be connected to the base part and rotated relative to this. The coronal portion of the angled part extends along a second axis which is not co-axial to the first axis. The exact shape of the coronal portion can be chosen according to designer preference. In some embodiments, at least a part of the coronal portion may have a curved axis. In preferred embodiments however, the coronal portion of the angled part extends along a second linear axis having an angle to the first axis. Preferably the central axis of the non-linear channel is formed solely by the first axis and the second axis, which are both linear but non-coaxial. Creating the non-linear channel of the modelling aid from two offset linear axes makes it easier to use the resulting screw channel with a standard, straight shafted screwdriver, as this can be more easily inserted through the channel.

Preferably the first axis and second axis are offset from one other by an angle of 10-60°, more preferably 15-45° and most preferably 15-35°.

In order to assist with the passage of the screw through the resulting screw channel, it is preferred that the coronal portion of the tubular side wall of the angled part comprises a conical section adjacent to the apical portion, the diameter of the conical section increasing from its coronal to apical end. This provides more room for the screw to pivot as the angle of the screw channel changes. In a particularly preferred embodiment the apical portion is a circular cylindrical portion having a first radius, and the coronal portion comprises a conical section adjacent to the apical portion having a circular cross-section whose radius decreases in the coronal direction, and a circular cylindrical section extending from the conical section to the coronal end having a radius less than the first radius. This assists in the passage of the screw through the resulting screw channel as well as the insertion of a screw driver. In some embodiments the tubular side wall further includes a cylindrical section linking the apical portion to the coronal cylindrical section. This eases manufacturing of the angled part.

According to the present invention the base part comprises an anti-rotation section. This anti-rotation section can be located on the interior or exterior surface of the base part. The location will be determined by the geometry of the complementary anti-rotation section on the underlying component. For example, when the underlying component comprises an abutment, or base coping, having an anti-rotation section on its external surface, the anti-rotation section of the base part will be located on its interior surface. The base part can then be placed over the abutment or base coping such that the two anti-rotation sections are brought into contact in order to rotationally fix the relative orientation of these components. Alternatively, when the underlying component comprises an internal anti-rotation section, the anti-rotation section of the base part will be located on its exterior surface.

Preferably the anti-rotation section is located on the interior surface of the base part. This enables the base part to be fitted over, rather than within, the underlying component, which prevents undue narrowing of the resulting screw channel.

Preferably the anti-rotation section extends over at least a quarter of the axial length of the base part, more preferably this extends over between 45-70% of the axial length of the base part.

The anti-rotation section of the base part can have any non-circular symmetric cross-section. Many suitable anti-rotation cross-sections are known within the dental field and any can be used in the present invention. In particular, the anti-rotation section may have a polygonal cross-section, such as a square, hexagon or octagon. Alternatively the anti-rotation section may comprise a number of circumferentially spaced grooves and/or protrusions.

The non-circular-symmetric cross-section of the anti-rotation section preferably has an n-fold rotational symmetry, where n is greater than 1, such that the base part can be positioned on the underlying component in a number of discrete angular orientations. Preferably the anti-rotation section has a 4- to 8-fold symmetry. Most preferably, the anti-rotation section has a 4-fold symmetry. This provides a suitable number of alternative angular orientations while keeping the complexity of the cross-sectional shape to a minimum. In a particularly preferred embodiment, the anti-rotation section comprises four evenly circumferentially spaced grooves. In other embodiments however the anti-rotation means can have 2- or 3-fold rotational symmetry, for example the anti-rotation section can comprise two or three evenly circumferentially spaced grooves. More generally therefore the anti-rotation section preferably has a 2- to 8-fold rotational symmetry. Preferably the base part further comprises protrusions interposed between the grooves. The protrusions provide extra grip to hold the base part on the underlying component. The protrusions may extend the full length of the grooves but preferably these have an axial extent less than the grooves.

More generally, the base part preferably comprises one or more protrusion, preferably a plurality of protrusions, extending radially from the surface of the base part on which the anti-rotation section is located, said one or more protrusion being arranged for gripping the dental implant component. In preferred embodiments, as mentioned above, the base part is placed over the dental implant component and therefore preferably the one or more protrusions extend radially from the interior surface of the base part. Preferably the axial extent of the protrusions is less than the axial extent of the anti-rotation section.

According to the present invention, when the base and angled parts are connected together they form a closed channel. Although this channel must have a continuous side wall, the modelling aid can be designed such that the wall thickness of this channel is not uniform. Thicker areas of wall will usually result at the overlap between the base and angled parts. Furthermore, certain areas of the base or angled part can be provided with a reduced sidewall thickness on the interior surface of the sidewall. This creates wider areas of the channel, which can be beneficial as these will result, after casting, in a wider area of final screw channel. In order to ease passage of a screw through a non-linear screw channel, it is beneficial if the channel is wider at the curved or bent part. In certain preferred embodiments, therefore, the tubular side wall of the base or angled part is thinned at the proximal end of the part such that the open proximal end of the part is widened. In order to affect the width of the resulting screw channel, the thinning must occur on the part which, in use, is covered by the other part, i.e., the part which forms the inner wall of the closed channel. In preferred embodiments, as discussed above, the apical portion of the angled part fits over the base part to form a friction fit with the exterior surface of the base part. Thus, in such embodiments, it is preferred that the tubular side wall of the base part is thinner at its coronal end. In a particularly preferred embodiment, a proximal portion of the side wall can be removed altogether, thus effectively forming an axially extending protrusion at the proximal end of the part.

In one preferred embodiment therefore, one of the base part and angled part comprises a cut out at its proximal end wherein, when the base part is connected to the angled part, the cut out is located on the interior of the closed channel formed by the components. The cut out preferably has a circumferential extent of between 90-270°, most preferably approximately 180°. Such a cut out, when angularly aligned with the non-linear channel formed by the angled part, assists in the passage of the screw and driver through the channel as it widens the resulting screw channel at the inner radius of the curve or bend in the non-linear channel. As discussed above, in preferred embodiments the apical end of the angled part is shaped to form a friction fit with the exterior surface of the base part. In such embodiments therefore, the base part preferably comprises a cut out at its coronal end.

When the base part comprises a cut out as described above, in order to ensure that the non-linear channel of the angled part and cut out of the base part are aligned, the above described rotational stops can be used. Thus, rather than arranging the stops to enable a "micro placement" of the modelling aid within the angle of rotational symmetry of the anti-rotation section, the rotational stops of the present invention can be arranged to prevent misalignment between a cutout of the base part and the non-linear channel of the angled part.

For example, the base part may comprise a cut out at its coronal end and two radially extending protrusions on its exterior surface angularly aligned with the edges of the cut out. An angled part comprising a single radially or axially extending protrusion angularly aligned with the central axis of the non-linear channel can then be positioned such that the protrusion is located between the radial protrusions of the base part.

Alternatively, the base part may comprise a cut out at its coronal end and a single radially extending protrusion on its exterior surface, located diametrically opposite the cut out. An angled part comprising a single radially or axially extending protrusion angularly aligned with the non-linear channel can then be positioned such that the protrusion of the base part is located between the opposing sides of the protrusion of the angled part.

In both of the above examples the rotational stops can be sized and located such that the non-linear channel cannot be rotated out of alignment with the cut out, i.e., the central axis of the non-linear channel remains rotationally aligned with the cut out.

Of course, as the cut out creates an axially extending protrusion at the proximal end of the part, it is possible for this protrusion to form rotational stops which interact with rotational stops on the other part. However, this is less preferred as this will result in these rotational stops being located on the interior surface of the closed channel, which, as discussed above, reduces the smoothness of the resulting screw channel. For this reason it is preferred that the cut out is not arranged to interact directly with rotational stops on the other part and that instead the cut out is provided in addition to the two or more rotational stops of the part, preferably the base part.

The modelling aid of the present invention is intended for use in combination with a dental implant component, such that the modelling aid can be used in a wax-up method to form an individualised coping.

Therefore, according to a further aspect, the present invention comprises a modelling aid as described above in combination with an dental implant component, the component comprising a screw bore which, when the modelling aid is connected to the dental implant component, is in communication with the closed channel of the modelling aid.

The dental implant component preferably further comprises an anti-rotation section which is complementary to the anti-rotation section of the base part. This means that, when the anti-rotation section of the base part is in contact with the anti-rotation section of the dental implant component, relative rotation between these parts is not possible.

The dental implant component may be the abutment part of a one-piece implant. In such cases, the screw bore will be a blind bore. In other embodiments, the dental implant component may be a coping, for attachment to an abutment or the abutment part of a one-piece implant, or the dental implant component may itself be the abutment part of a two-piece implant. In such embodiments the screw bore of the dental implant component will usually be a through bore. Furthermore, when the dental implant component is not the implant itself, the dental implant component preferably comprises connection geometry for enabling the component to be connected to a dental implant.

Preferably the dental implant component is an abutment comprising a coronal end, an apical end and a through bore extending from the apical to coronal end, the abutment comprising, at its apical end, a first anti-rotation means for cooperation with a dental implant and, at its coronal end, a second anti-rotation means for cooperation with the anti-rotation section of the base part. Preferably both the first and second anti-rotation means are located on the exterior surface of the abutment. Preferably the abutment further comprises a radially outwardly extending shoulder located between the first and second anti-rotation means, wherein the apical end of the base part is shaped to abut against said shoulder.

A screw seat can be formed in either the modelling aid or dental implant component but is preferably located in the dental implant component.

Preferred embodiments of the present invention will now be described, by way of example only, with reference to the accompanying drawings, in which:

FIG. 8 shows a perspective view of a base part according to a second embodiment of the present invention;

FIGS. 9A and 9B show a top and bottom view respectively of the base part of FIG. 8;

FIG. 10 shows a cross-section along line B-B of FIG. 9A;

Figure 1:
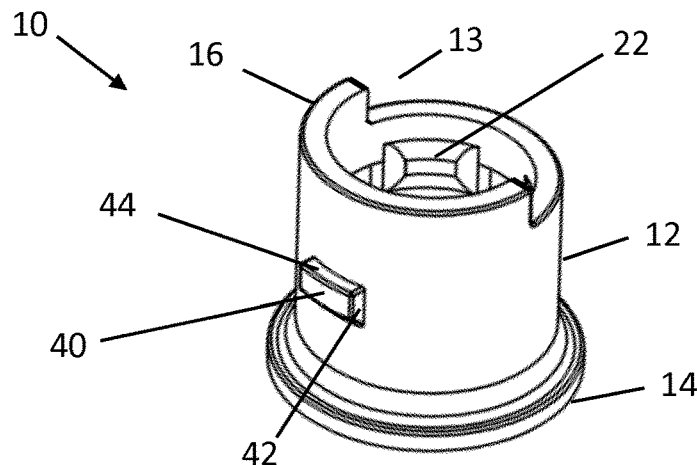
FIG. 1 shows a perspective view of a base part according to a first embodiment of the present invention.
Figure 2A:
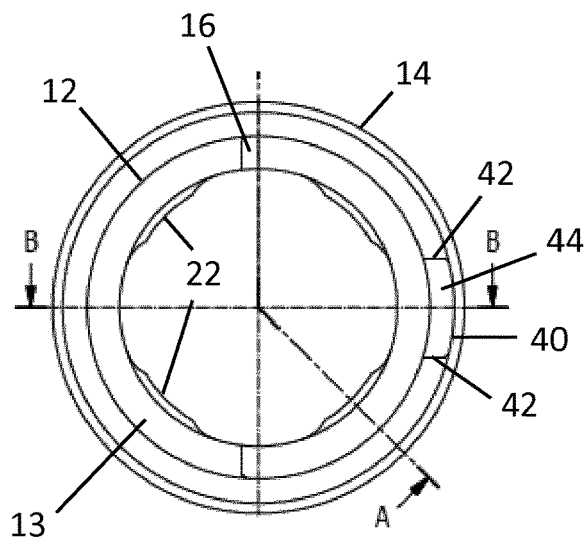
FIGS. 2A and 2B show a top and bottom view respectively of the base part of FIG. 1.
Figure 2B:
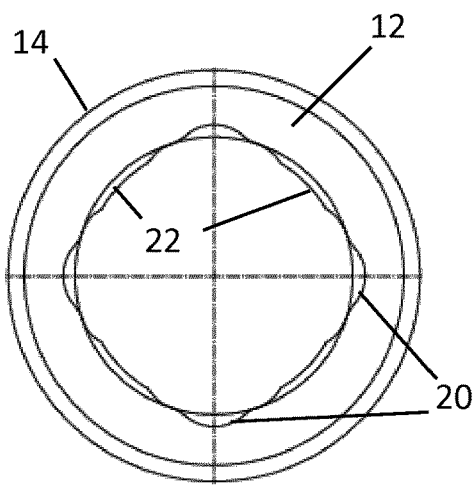
Figure 3:
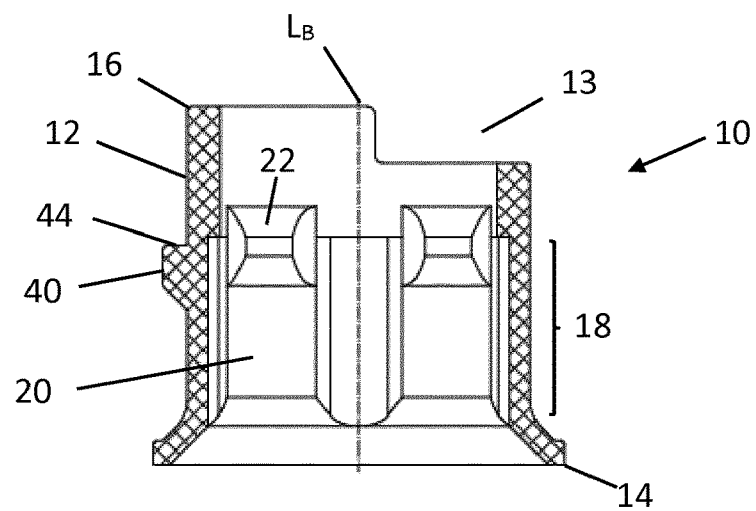
FIG. 3 shows a cross-section along line B-B of FIG. 2A.

FIGS. 1-3 show a base part 10 of a modelling aid 1 according to a first embodiment of the present invention. Base part 10 comprises a tubular side wall 12 extending from an open apical end 14 to an open coronal end 16 along a linear longitudinal axis $L_B$.

On its interior surface the side wall 12 comprises an anti-rotation section 18 having a non-circular-symmetric cross-section in a plane perpendicular to the longitudinal axis $L_B$ of the base part 10. This anti-rotation section 18 is designed to cooperate with a complementary anti-rotation section on the underlying dental component of the system, e.g. an abutment or base coping. In the present embodiment the anti-rotation section 18 comprises four evenly circumferentially spaced grooves 20, as best seen in FIG. 2B. The interior surface of the base part 10 further comprises four inwardly extending protrusions 22, interposed between the grooves 20 of the anti-rotation section 18. These are provided in order to firmly grip the underlying dental implant component. In this embodiment therefore the base component 10 is intended to be placed over the underlying component.

Figure 4:
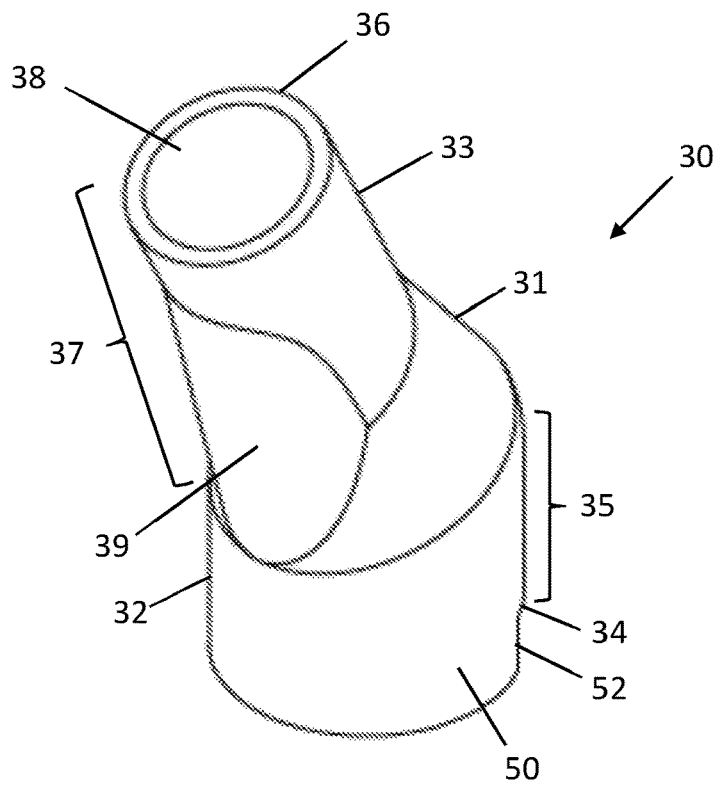
FIG. 4 shows a perspective view of an angled part according to the first embodiment of the present invention, for use with the base part of FIGS. 1-3.
Figure 5:
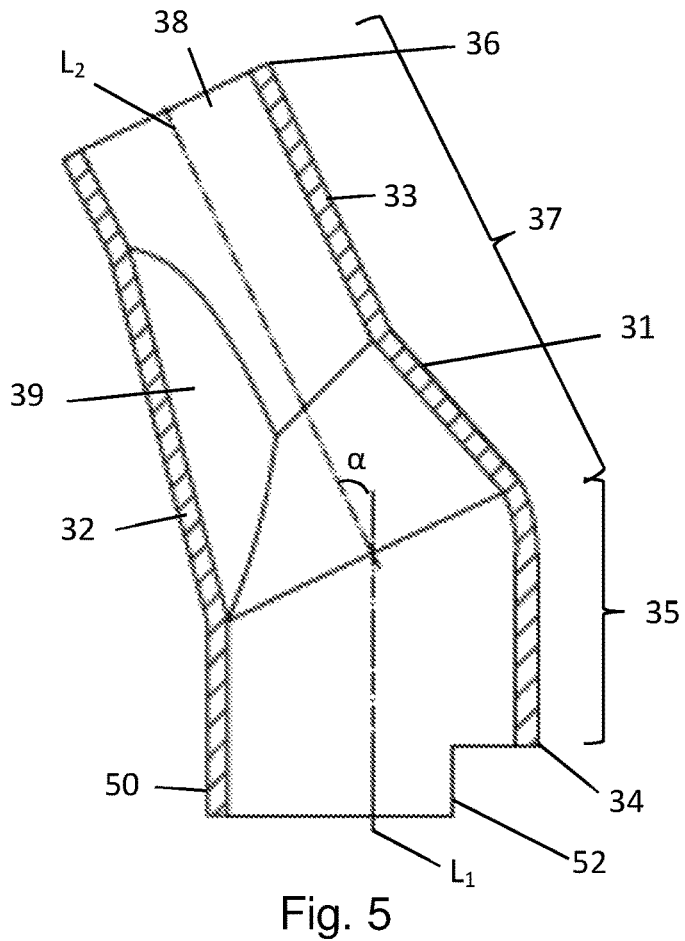
FIG. 5 shows a longitudinal cross-section through the angled part of FIG. 4.

FIGS. 4-5 show the angled part 30 which, together with base part 10, forms the modelling aid 1. Angled part 30 comprises a tubular side wall 32 extending from an apical end 34 to a coronal end 36. It comprises an apical portion 35, which extends along a first linear axis $L_1$ and a coronal portion 37, which extends along a second linear axis $L_2$, wherein the second linear axis $L_2$ is angled with respect to the first linear axis $L_1$. As a result, the tubular sidewall 32 forms a non-linear channel 38. In the present embodiment angle α between the second axis $L_2$ and the first axis $L_1$ is 25°.

Coronal portion 37 is formed of a conical section 31, which is adjacent to the apical portion 35, and a cylindrical section 33, which extends from the coronal end of the conical section 31 to the coronal end 36 of the angled part 30. The radius of the apical portion 35 is larger than that of cylindrical section 33, with the conical section 31 tapering outwardly in the apical direction from the radius of the cylindrical section 33 to the radius of the apical portion 35. This widening of the non-linear channel 38 assists in the passage of the screw through the final screw channel. An additional cylindrical section 39 extends from the apical portion 35 to the cylindrical section 33, to ease manufacturing.

As can best be seen from FIG. 5, in this embodiment the central axis of the non-linear channel 38 is formed solely of the first and second linear axes $L_1$, $L_2$. In other embodiments however at least a portion of the central axis of the coronal portion 37 may be curved or the coronal portion 37 may comprise adjacent sections extending along different central axes.

Figure 6:
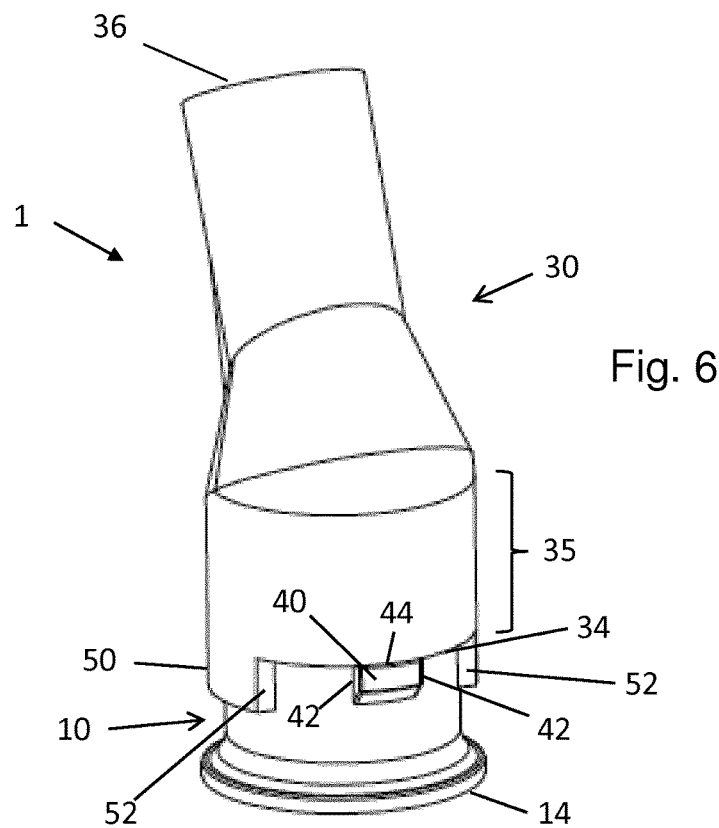
FIG. 6 shows the base and angled parts of the first embodiment in combination.
Figure 7:
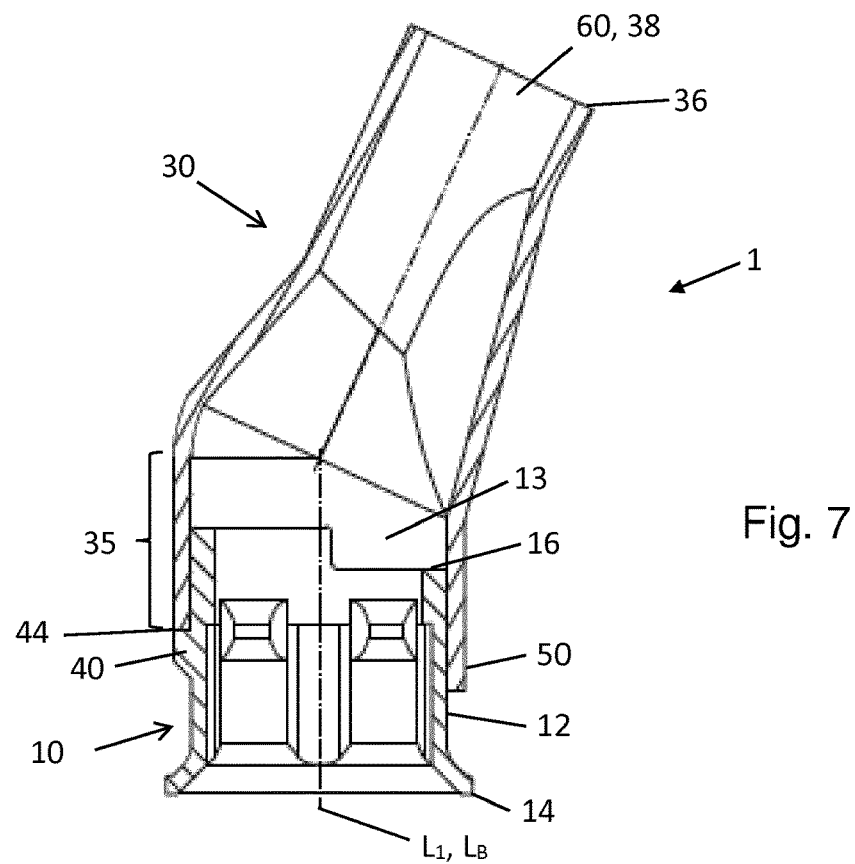
FIG. 7 shows the a longitudinal cross-section through the combination of FIG. 6.

FIGS. 6 and 7 show the base part 10 and angled part 30 in combination. The apical portion 35 of the angled part 30 is sized and shaped to fit over the coronal end 16 of the base part 10 in order to form a friction fit with the exterior surface of the tubular side wall 12. When the two parts are connected together, a continuous closed channel 60 is formed extending from the apical end 14 of the base part 10 to the coronal end 36 of the angled part 30. The first axis $L_1$ of the apical portion 35 is coaxial to the longitudinal axis $L_B$ of the base part 10. This enables the angled part 30 to be rotated about the longitudinal axis $L_B$ of the base part 10 in order to adjust the rotational orientation of the non-linear channel 38 relative to the base part 10.

In order to limit the relative rotation between the base part 10 and angled part 30 each part is provided with rotational stops. Base part 10 comprises a single, radially extending protrusion 40 on the exterior surface of the side wall 12. The two opposing radially and axially extending surfaces of this protrusion 40 each form a rotational stop 42.

Angled part 30 also comprises a single protrusion, this time an axially extending protrusion 50 at the apical end 34 of the component. Once again, the opposing radially and axially extending surfaces of this protrusion 50 form the rotational stops 52. The circumferential extent of protrusion 50 is larger than that of protrusion 40.

When angled part 30 is placed over base part 10, the radially extending protrusion 40 is located between the opposing rotational stops 52 formed by axially extending protrusion 50. Furthermore, apical end 34 of the angled part 30 rests on the coronally facing abutment surface 44 provided by the coronal end of protrusion 40. This helps to correctly position the angled part 30 on the base part 10 and prevent this from tilting during rotational adjustment of this part 30 about the longitudinal axis $L_B$.

As can best be seen in FIG. 6, the angled part 30 can be rotated relative to the base part 10 until one of the rotational stops 52 of the angled part abuts against a rotational stop 42 of the base part 10. The modelling aid 1 therefore allows for controlled angular adjustment of the non-linear channel 38 relative to the base part 10 (and hence the underlying component).

Returning to FIGS. 1-3, base part 10 comprises a cut out 13 at its coronal end 16. This cut out has a circumferential extent of approximately 180°. As can be seen from FIG. 7, this cut out 13 creates a thinner area of channel wall. The rotational stops 42, 52 are arranged such that the non-linear channel 38 cannot be rotated out of alignment with the cut out 13. This ensures that the resulting screw channel of a coping made using the modelling aid 1 of the present invention will be wider at the bend in the channel, which will assist the passage of the screw through this channel. The cut out 13 and resulting wider screw channel will also help the screwdriver to reach the screw once this is inserted into the passage.

A further preferred embodiment of the present invention will now be described, in which like reference numerals refer to like parts.

In this second embodiment, base part 110, shown in FIGS. 8-10, is substantively identical to the base part 10 of the first embodiment. A tubular side wall 112 extends from an open apical end 114 to an open coronal end 116 along a linear longitudinal axis $L_B$. On its interior surface the side wall 112 comprises an anti-rotation section 118 comprising four evenly circumferentially spaced grooves 120, as best seen in FIG. 9B. The interior surface of the base part 110 further comprises four inwardly extending protrusions 122, interposed between the grooves 120 of the anti-rotation section 118.

Base part 110 differs from the base part 10 of the first embodiment in that it comprises three circumferentially spaced, radially extending protrusions 140 on the exterior surface of the side wall 112.

Similarly, angled part 130 is substantively identical to angled part 30. Angled part 130 comprises a tubular side wall 132 extending from an apical end 134 to a coronal end 136. It comprises an apical portion 135, which extends along a first linear axis $L_1$ and a coronal portion 137, which extends along a second linear axis $L_2$, wherein the second linear axis $L_2$ is angled with respect to the first linear axis $L_1$. As a result, the tubular sidewall 132 forms a non-linear channel 138. The central axis of the non-linear channel 138 is formed solely of the first and second linear axes $L_1$, $L_2$. In the present embodiment angle α between the second axis $L_2$ and the first axis $L_1$ is 25°. Coronal portion 137 is formed of a conical section 131, which is adjacent to the apical portion 135, and a cylindrical section 133, which extends from the coronal end of the conical section 131 to the coronal end 136 of the angled part 130. The radius of the apical portion 135 is larger than that of cylindrical section 133, with the conical section 131 tapering outwardly in the apical direction from the radius of the cylindrical section 133 to the radius of the apical portion 135. An additional cylindrical section 139 extends from the apical portion 135 to the cylindrical section 133, to ease manufacturing.

Angled part 130 differs from the angled part 30 of the first embodiment only in that axially extending protrusion 150 has a narrower circumferential extent.

Figure 13:
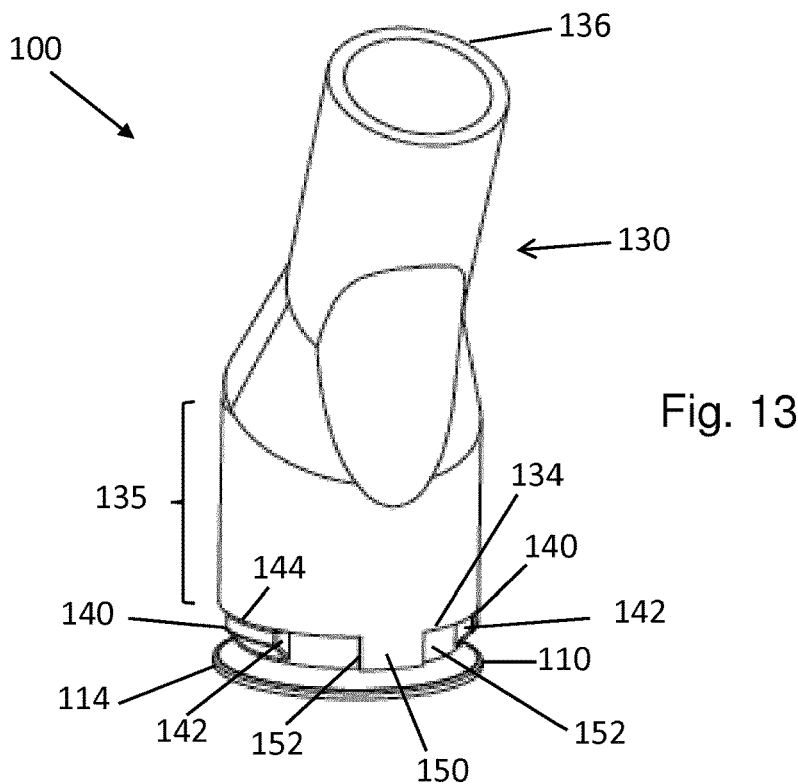
FIG. 13 shows the base and angled parts of the second embodiment in combination.
Figure 14:
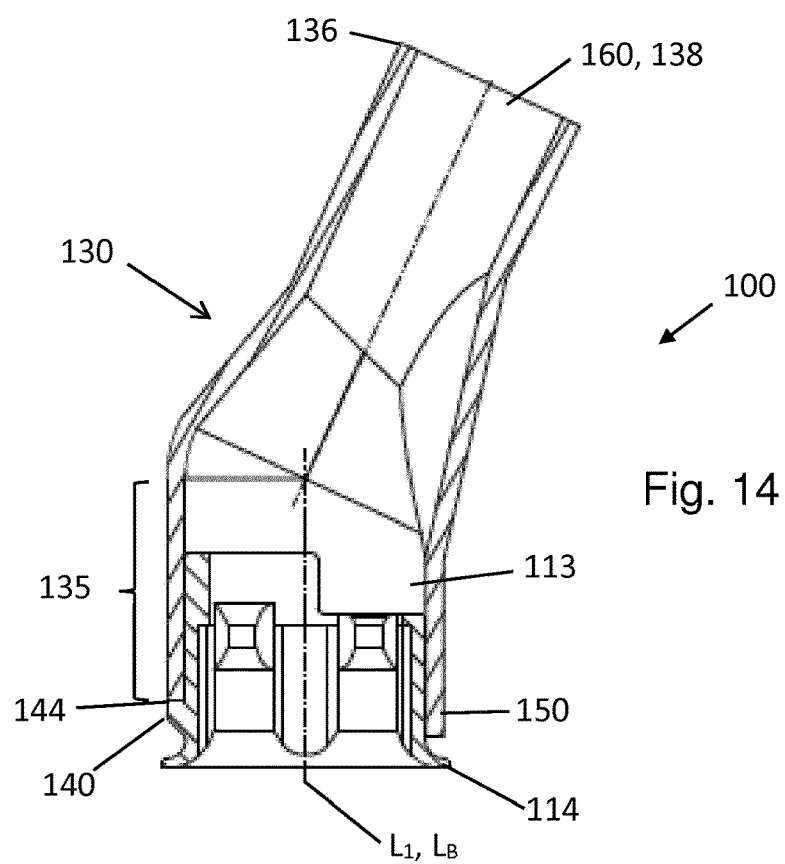
FIG. 14 shows the a longitudinal cross-section through the combination of FIG. 13.

As shown in FIG. 13, when base part 110 and angled part 130 are connected together, protrusion 150 is located between two of the protrusions 140 of the base part 110. As in the previous embodiment, the coronal surfaces 144 of the radially extending protrusions 140, form an abutment surface for the apical end 134 of the angled part 130.

Relative rotation between the base part 110 and angled part 130 is limited by one of the opposing rotational stops 152 of the axially extending protrusion 150 contacting a rotational stop 142 of the base part 110.

Once again, in this embodiment the rotational stops 142, 152 are arranged to ensure that the non-linear channel 138 is maintained in rotational alignment with the cut out 113 of the base part 110. However, in this second embodiment it is further possible for the axially extending protrusion 150 to be positioned between different radially extending protrusions 140 on the base part 110. This embodiment therefore provides an example of how the rotational stops of the present invention could be used to provide alternative controlled relative positions of the base and angled parts.

Figure 15A:
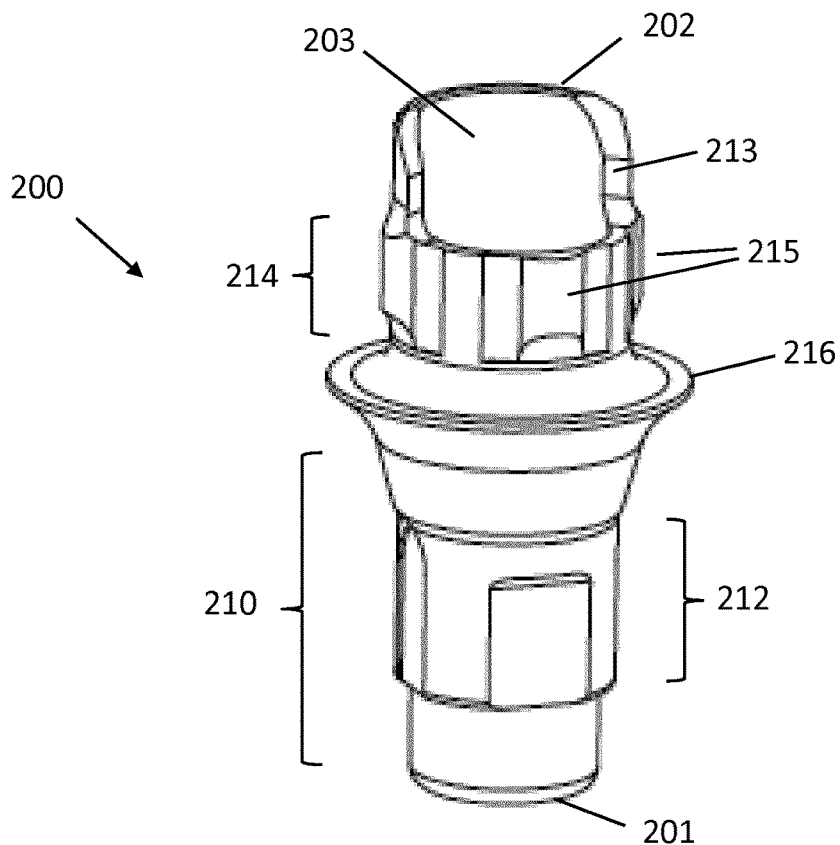
FIGS. 15A and 15B show a perspective and cross-section view respectively of a dental abutment that can be used with the second embodiment of the present invention.
Figure 15B:
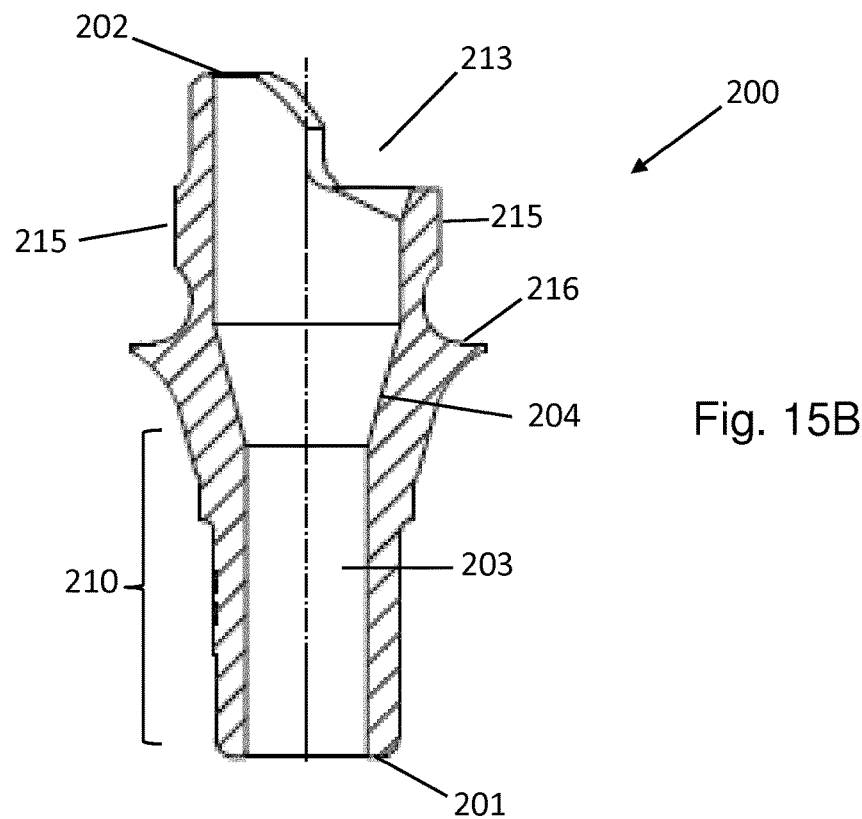

The modelling aids 1, 100 of the present invention are intended for use with an underlying dental implant component. Such a component is shown in FIGS. 15A and 15B.

Abutment 200 is the separate abutment part of a two-part dental implant. It comprises an apical end 201 and a coronal end 202 with a through bore 203 extending therebetween. Through bore 203 comprises a screw seat 204. Abutment 200 therefore enables a screw to be seated within the component in order to fasten this to an implant.

On the exterior surface of the abutment 200 connection geometry 210 is provided which is complementary to the dental implant. This enables the abutment 200 to be inserted into a axially extending bore within the dental implant. The connection geometry 210 includes an anti-rotation means 212. A further anti-rotation means 214 is provided towards the coronal end 202 of the implant. This anti-rotation means 214 comprises four axially extending, evenly circumferentially spaced radial protrusions 215.

This anti-rotation means 214 is complementary to the anti-rotation section 118 of base part 110 of FIG. 8. The protrusions 215 are therefore sized to fit snugly within grooves 120. Furthermore, protrusions 122 on the interior surface of the side wall 112 grip the external surface of the abutment 200 in order to securely connect the base part 110 to the abutment 200.

Inbetween the anti-rotation means 212, 214 abutment 200 further comprises a radially outwardly extending, coronally facing shoulder 216.

Figures 16A, 16B:
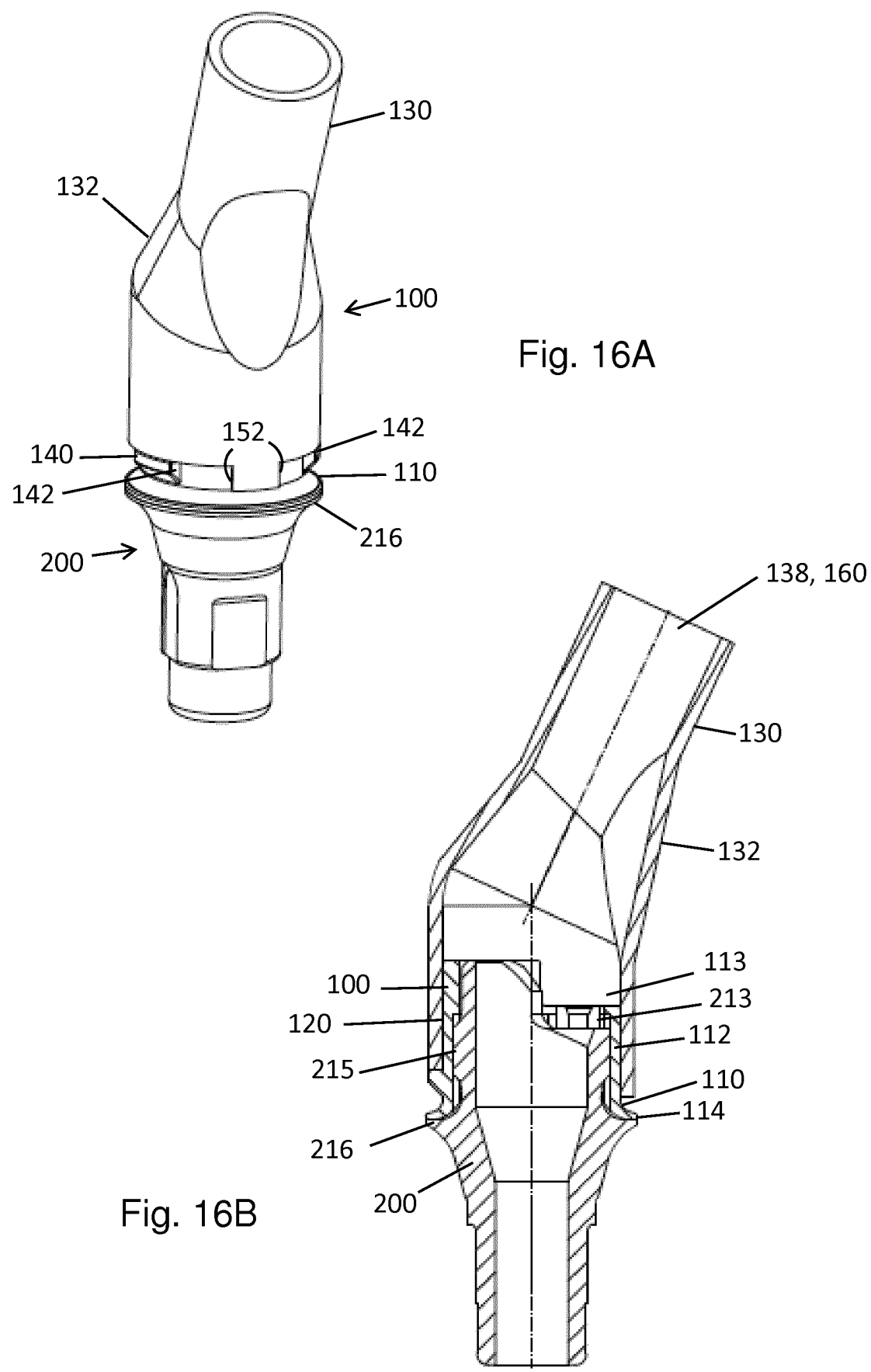
FIG. 16A shows a combination of the abutment of FIG. 15 with the base and angled parts of FIGS. 8 to 14.
FIG. 16B shows a longitudinal cross-section through the combination of FIG. 16A.

The modelling aid 100 is shown in combination with the abutment 200 in FIGS. 16A and 16B. Here it can be seen that the coronal end 114 of the base part 110 rests on the shoulder 216 of the abutment 200 and the protrusions 215 of the anti-rotation means 214 are housed in the grooves 120 of the base part 110. Thus the base part 110 is connected to the abutment 200 in a rotationally and axially fixed manner.

In this embodiment, abutment 200 comprises a cut out 213 at its coronal end 202 which is complementary to the cut out 113 of the base part 110. This additionally helps with the passage of the screw and screw driver.

In use the modelling aid 100 is positioned on the abutment 200 as shown in FIGS. 16A and 16B. The angled part 130 can be rotated relative to the base part 110 within the limits set by the rotational stops 142, 152 in order to best position the non-linear channel 138. A wax-up is then made of the desired coping, during which the tubular side walls 112, 132 are surrounded by wax. The wax-up, together with the modelling aid 100, can then be removed from the abutment and cast, to form a mould. During this process the modelling aid 100 is destroyed.

The mould is then used to form the coping using, e.g. gold. The final coping will contain a screw channel having the shape of the interior wall of the closed channel 160 of the modelling aid 100. This will include the anti-rotation section 118 and thus the final coping can be placed in non-rotational engagement with the abutment 200.

A further preferred embodiment of the present invention will now be described, in which like reference numerals refer to like parts.

Figure 17A:
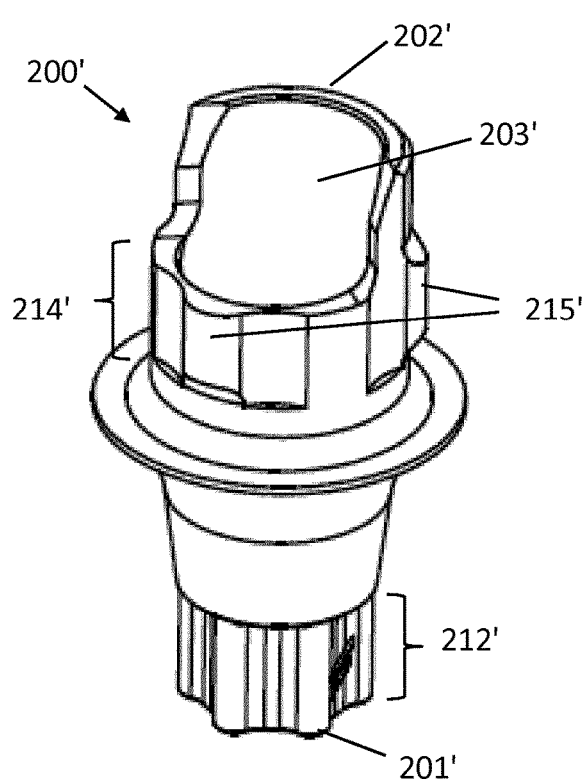
FIG. 17A shows a perspective view of a second dental abutment that can be used with a third embodiment of the present invention.
Figure 17B:
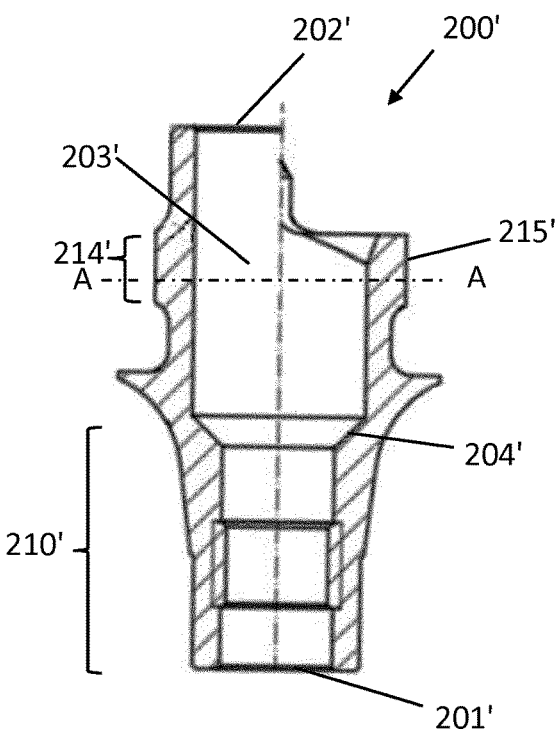
FIG. 17B shows a longitudinal cross-section of the dental abutment of FIG. 17A.
Figure 17C:
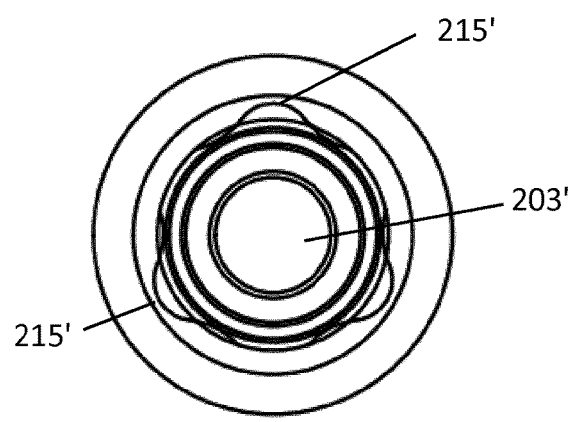
FIG. 17C shows a cross-section of the dental abutment of FIG. 17A through Line A-A of FIG. 17B.
Figure 18A:
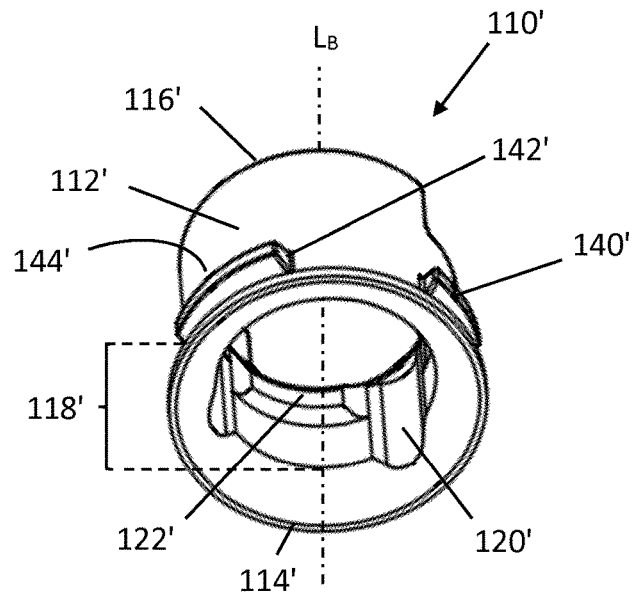
FIGS. 18A-C show a perspective, apical and coronal views of a base part in accordance with a third embodiment of the present invention.
Figure 18B:
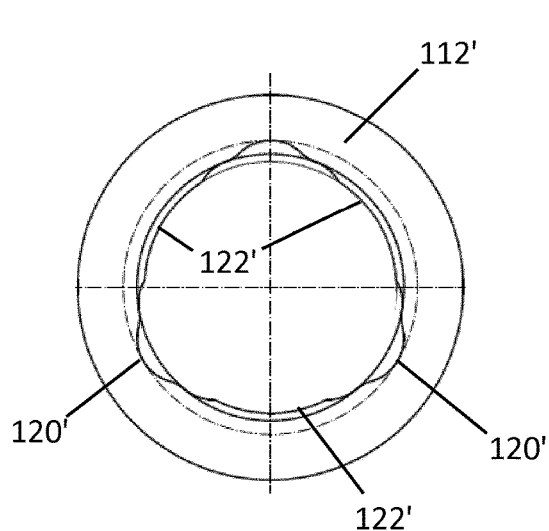
Figure 18C:
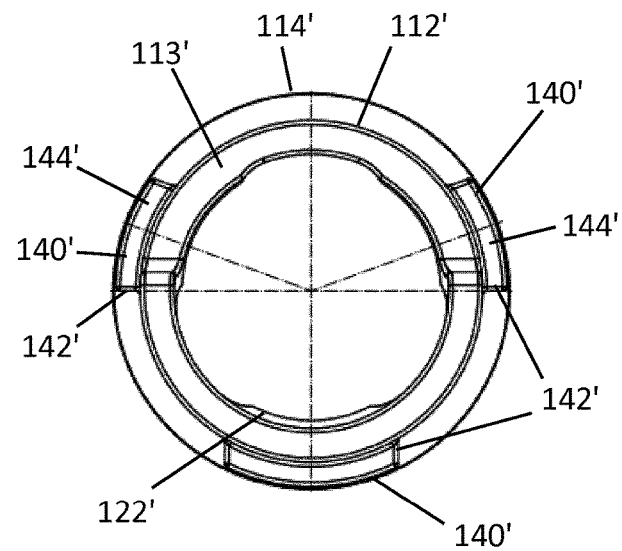

FIGS. 17A-C show abutment 200', which can be used with a modelling aid in accordance with the present invention, the base part 110' of which is shown in FIGS. 18A-C.

Abutment 200' is the separate abutment part of a two-part dental implant. It comprises an apical end 201' and a coronal end 202' with a through bore 203' extending therebetween. Through bore 203' comprises a screw seat 204'. Abutment 200' therefore enables a screw to be seated within the component in order to fasten this to an implant.

On the exterior surface of the abutment 200' a connection geometry 210' is provided which is complementary to the dental implant. This enables the abutment 200' to be inserted into an axially extending bore within the dental implant. The connection geometry 210' includes an anti-rotation means 212'. A further anti-rotation means 214' is provided towards the coronal end 202' of the abutment. This anti-rotation means 214' comprises three axially extending, evenly circumferentially spaced radial protrusions 215', as can best be seen in FIG. 17C.

In this third embodiment, base part 110', shown in FIGS. 18A-C, is substantively identical to the base part 110 of the second embodiment. A tubular side wall 112' extends from an open apical end 114' to an open coronal end 116' along a linear longitudinal axis $L_B$. Base part 110' comprises three circumferentially spaced, radially extending protrusions 140' on the exterior surface of the side wall 112'.

Base part 110' differs from the base part 110 of the second embodiment in that on its interior surface the side wall 112' comprises an anti-rotation section 118' comprising three evenly circumferentially spaced grooves 120', as best seen in FIG. 18B. The interior surface of the base part 110' further comprises three inwardly extending protrusions 122', interposed between the grooves 120' of the anti-rotation section 118'.

The anti-rotation means 214' of abutment 200' is complementary to the anti-rotation section 118' of base part 110'. The protrusions 215' are therefore sized to fit snugly within grooves 120'. Furthermore, the protrusions 122' on the interior surface of the side wall 112' grip the external surface of the abutment 200' in order to securely connect the base part 110' to the abutment 200'.

Figure 11:
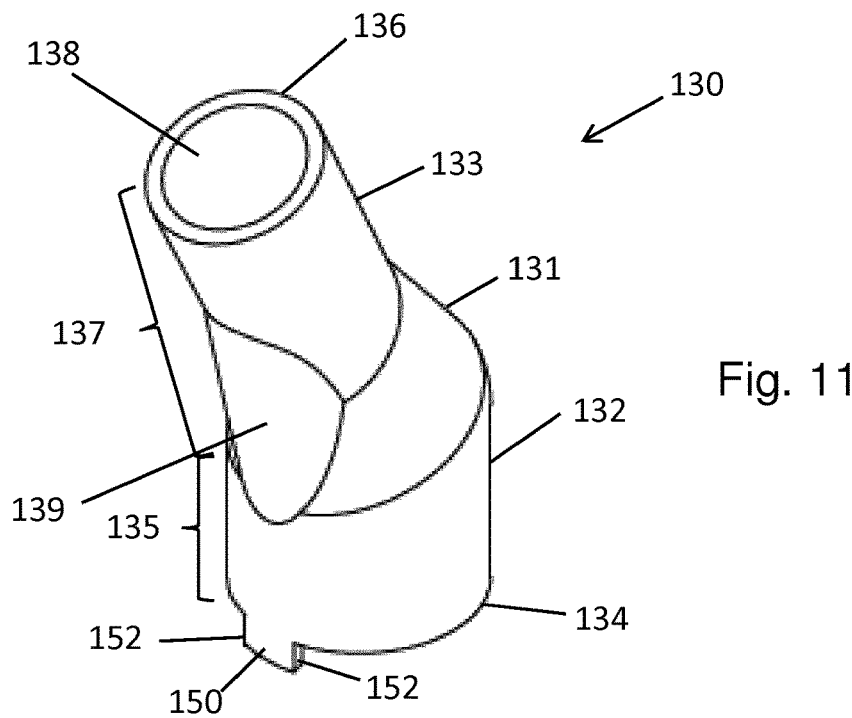
FIG. 11 shows a perspective view of an angled part according to the second embodiment of the present invention, for use with the base part of FIGS. 8-10.
Figure 12:
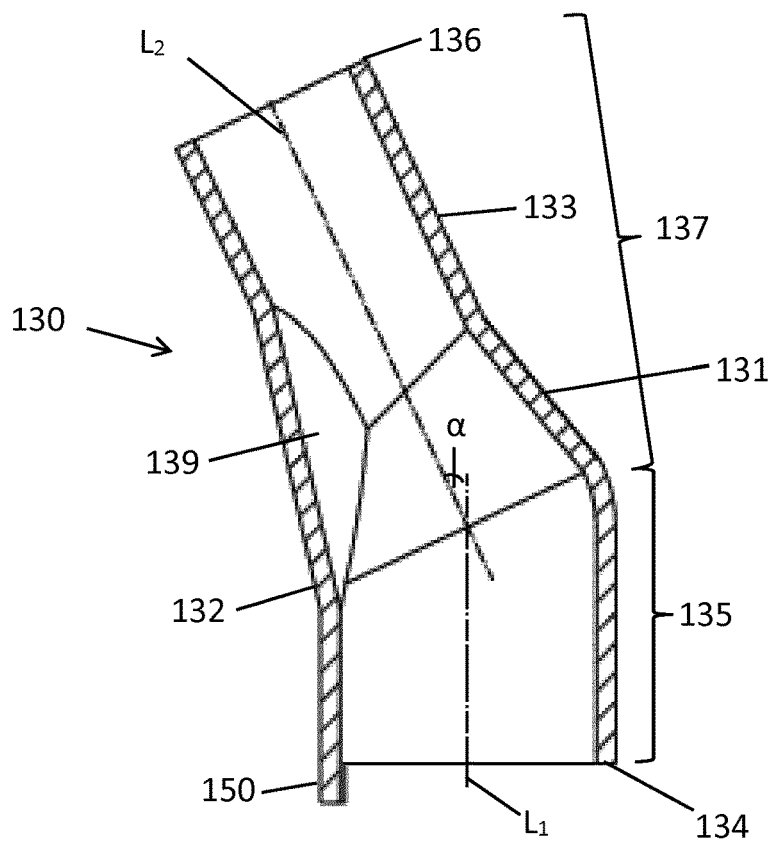
FIG. 12 shows a longitudinal cross-section through the angled part of FIG. 11.

Base part 110' can be used in combination with the angled part 130 shown in FIGS. 11 and 12 in respect of the second embodiment. In an identical manner as described in relation to the second embodiment, when base part 110' and angled part 130 are connected together protrusion 150 is located between two of the protrusions 140' of the base part 110'. The coronal surfaces 144' of the radially extending protrusions 140', form an abutment surface for the apical end 134 of the angled part 130.

Relative rotation between the base part 110' and angled part 130 is limited by one of the opposing rotational stops 152' of the axially extending protrusion 150 contacting a rotational stop 142' of the base part 110'.

In further alternative embodiment, not shown, base part 10 could be adapted for connection to abutment 200' simply by altering the number and shape of grooves 20 and protrusions 22 in line with the grooves 120' and protrusions 122' of base part 110'.

The above described embodiments are for illustrative purposes only and the skilled person will realize that alternative arrangements are possible which fall within the scope of the claims. For example, in other embodiments the radially extending protrusions may be formed on the angled part and the axially extending protrusion on the base part. It is possible for either part to comprise additional radially or axially extending protrusions. Further, the angled part can form a friction fit with the interior surface of the base part and/or the anti-rotation section of the base part can be located on the exterior surface. The modelling aid of the present invention can be designed for use with a coping or abutment part of a one-piece implant. Furthermore the anti-rotation connection between the implant component, e.g. abutment, and base part can comprise 2-fold or 5-fold and higher rotational symmetry by altering the number of complementary grooves and protrusions.

The invention claimed is:

1. A two part modelling aid for connection to a dental implant component, the modelling aid comprising:
a hollow base part comprising:
an open apical end,
an open coronal end, and
a tubular side wall extending from the apical end to the coronal end along a linear longitudinal axis, the tubular side wall including an interior surface and an exterior surface, one surface of said interior surface and said exterior surface comprising an anti-rotation section having a non-circular symmetric cross-section in a plane perpendicular to the linear longitudinal axis; and
a hollow angled part comprising:
an open apical end,
an open coronal end, and
a tubular side wall extending between the apical end and the coronal end and including an interior surface and an exterior surface, the tubular side wall forming:
an apical portion of the hollow angled part extending along a first linear axis, and
a coronal portion of the hollow angled part extending along a second axis, the second axis being non-coaxial to the first linear axis such that the tubular side wall creates a non-linear channel,
wherein:
the apical portion is sized and shaped to form a friction fit with the hollow base part,
when the hollow base part is connected to the hollow angled part, a closed channel is formed extending from the apical end of the hollow base part to the coronal end of the hollow angled part, the first linear axis of the apical portion of the hollow angled part being coaxial to the linear longitudinal axis of the hollow base part and the anti-rotation section of the hollow base part being exposed on a surface of the hollow base part, and
the hollow base part and the apical portion of the hollow angled part each comprise at least two circumferentially spaced rotational stops, each of the at least two circumferentially spaced rotational stops being formed by a radially and axially extending surface, the at least two circumferentially spaced rotational stops being arranged such that, when the hollow base part is connected to the hollow angled part, relative rotation in either direction is limited by abutting of a rotational stop of the hollow base part against a rotational stop of the hollow angled part.

2. The two part modelling aid as claimed in claim 1, wherein the hollow base part and the apical portion of the hollow angled part each comprise a single protrusion, and opposing sides of the single protrusion form the at least two circumferentially spaced rotational stops of each of the hollow base part and the apical portion of the hollow angled part.

3. The two part modelling aid as claimed in claim 1, wherein:
one of the hollow base part and the apical portion of the hollow angled part comprises a single protrusion, and opposing sides of the single protrusion form the at least two circumferentially spaced rotational stops of the one of the hollow base part and the apical portion of the hollow angled part, and
the other of the hollow base part and the apical portion of the hollow angled part comprises at least two protrusions, and mutually facing sides of the at least two protrusions form the at least two circumferentially spaced rotational stops of the other of the hollow base part and the apical portion of the hollow angled part.

4. The two part modelling aid as claimed in claim 1, wherein:
the at least two circumferentially spaced rotational stops of one of the hollow base part and the apical portion of the hollow angled part are formed by one or more radially extending protrusions that extend radially from the tubular side wall of the one of the hollow base part and the apical portion of the hollow angled part, and
the at least two circumferentially spaced rotational stops of the other of the hollow base part and the apical portion of the hollow angled part are formed by one or more axially extending protrusions that extend axially from a proximal end of the other of the hollow base part and the apical portion of the hollow angled part.

5. The two part modelling aid as claimed in claim 4, wherein the one or more radially extending protrusions further comprise a planar proximally facing abutting surface, arranged such that, when the hollow base part is connected to the hollow angled part, the proximal end of the other of the hollow base part and the apical portion of the hollow angled part rests upon the planar proximally facing abutting surface.

6. The two part modelling aid as claimed in claim 1, wherein the at least two circumferentially spaced rotational stops of the hollow base part and the apical portion of the hollow angled part are arranged such that a degree of relative rotational freedom between the hollow base part and the hollow angled part is equal to an angle of rotational symmetry of the anti-rotation section.

7. The two part modelling aid as claimed in claim 1, wherein the apical portion is sized and shaped to form a friction fit with the exterior surface of the hollow base part.

8. The two part modelling aid as claimed in claim 7, wherein the coronal end of the hollow base part comprises a cut out, and when the hollow base part is connected to the hollow angled part, the cut out is located on an interior of the closed channel.

9. The two part modelling aid as claimed in claim 1, wherein:
the apical portion is sized and shaped to form a friction fit with the exterior surface of the hollow base part,
the at least two circumferentially spaced rotational stops of the apical portion of the hollow angled part are formed by one or more axially extending protrusions that extend axially from the apical end of the hollow angled part, and
the at least two circumferentially spaced rotational stops of the hollow base part are formed by one or more radially extending protrusions that extend radially from the exterior surface of the tubular side wall.

10. The two part modelling aid as claimed in claim 9, wherein:
the hollow base part and the apical portion of the hollow angled part each comprise a single protrusion, and opposing sides of the single protrusion form the at least two circumferential spaced rotational stops of each of the hollow base part and the apical portion of the hollow angled part,
the hollow base part comprises a single radially extending protrusion on the exterior surface thereof, and the apical portion of the hollow angled part comprises a single protrusion extending axially from the apical end of the hollow angled part, and when the apical portion of the hollow angled part is connected to the hollow base part, the single radially extending protrusion of the hollow base part is positioned between the opposing sides of the single protrusion extending axially from the apical end of the hollow angled part.

11. The two part modelling aid as claimed in claim 9, wherein:
the hollow base part comprises at least two radially extending protrusions on the exterior surface thereof, and mutually facing sides of the at least two radially extending protrusions form the at least two circumferentially spaced rotational stops of the hollow base part,
the apical portion of the hollow angled part comprises a single protrusion extending axially from the apical end of the hollow angled part, and opposing sides of the single protrusion form the at least two circumferentially spaced rotational stops of the apical portion of the hollow angled part, and
when the apical portion of the hollow angled part is connected to the hollow base part, the single protrusion extending axially from the apical end of the hollow angled part is positioned between the mutually facing sides of the at least two radially extending protrusions of the hollow base part.

12. The two part modelling aid as claimed in claim 1, wherein the second axis of the coronal portion of the hollow angled part is a linear axis having an angle to the first linear axis.

13. The two part modelling aid as claimed in claim 12, wherein a central axis of the non-linear channel is formed solely by the first linear axis and the second axis, which are both linear and non-coaxial.

14. The two part modelling aid as claimed in claim 1, wherein the coronal portion of the tubular side wall of the hollow angled part comprises a conical section adjacent to the apical portion, and the conical section has a diameter increasing from a coronal end to an apical end thereof.

15. The two part modelling aid as claimed in claim 1, wherein the anti-rotation section is located on the interior surface of the hollow base part.

16. The two part modelling aid as claimed in claim 1 wherein the hollow base part comprises one or more protrusions extending radially from the one surface of the hollow base part on which the anti-rotation section is located, said one or more protrusions being arranged for gripping the dental implant component.

17. The two part modelling aid as claimed in claim 1, wherein one of the hollow base part and the hollow angled part comprises a cut out at a proximal end thereof, and when the hollow base part is connected to the hollow angled part, the cut out is located on an interior of the closed channel.

18. The two part modelling aid as claimed in claim 1, wherein the coronal end of the hollow base part comprises a cut out, and the at least two circumferentially spaced rotational stops are sized and located such that the non-linear channel cannot be rotated out of alignment with the cut out.

19. A combination of the two part modelling aid as claimed in claim 1 and the dental implant component, the dental implant component comprising a screw bore which, when the two part modelling aid is connected to the dental implant component, is in communication with the closed channel of the two part modelling aid.

20. The combination as claimed in claim 19, wherein the dental implant component further comprises an anti-rotation section which is complementary to the anti-rotation section of the hollow base part.

21. The combination as claimed in claim 19, wherein the dental implant component is an abutment comprising a coronal end, an apical end and a through bore extending from the apical end to the coronal end, the abutment comprising, at the apical end, a first anti-rotation means for cooperation with a dental implant and, at the coronal end, a second anti-rotation means for cooperation with the anti-rotation section of the hollow base part.

* * * * *